United States Patent

Gabor

[15] 3,691,542

[45] Sept. 12, 1972

[54] MAGNETIC MEMORY DISK DRIVE APPARATUS WITH REDUCED R. F. NOISE

[72] Inventor: Andrew Gabor, Danville, Calif.

[73] Assignee: Diablo Systems, Inc., Hayward, Calif.

[22] Filed: Nov. 2, 1970

[21] Appl. No.: 85,844

[52] U.S. Cl. ............................340/174.1 B, 310/248

[51] Int. Cl. .............................................G11b 23/02

[58] Field of Search..340/174.1 R, 174.1 C, 174.1 B; 179/100.2 A; 346/74 MD, 137; 310/72, 248, 273

[56] References Cited

UNITED STATES PATENTS

| | | | |
|---|---|---|---|
| 2,916,546 | 12/1959 | Ginsburg et al. | 179/100.2 T |
| 3,202,771 | 8/1965 | Wada | 179/100.2 T |
| 3,587,074 | 6/1971 | Angle et al. | 340/174.1 C |
| 3,577,133 | 5/1971 | Gartein et al. | 340/174.1 C |
| 1,957,152 | 5/1934 | Severy | 310/248 |
| 2,843,770 | 7/1958 | Knapp et al. | 310/72 |

*Primary Examiner*—Vincent P. Canney
*Attorney*—Flehr, Hohbach, Test, Albritton & Herbert

[57] ABSTRACT

A magnetic memory disk drive apparatus with reduced R.F. noise includes a d.c. drive motor. The disk is coupled to the motor shaft by a drive plate and a drive plate hub which have surfaces interleaved with a grounded housing to provide a shunt capacitance which reduces the noise signal produced by commutation reaching the magnetic disk.

15 Claims, 4 Drawing Figures

INVENTOR.

ANDREW GABOR

BY Flehr, Hohbach, Test, Albritton & Herbert

ATTORNEYS

INVENTOR.
ANDREW GABOR
BY Flehr, Hohbach, Test, Albritton & Herbert
ATTORNEYS

MAGNETIC MEMORY DISK DRIVE APPARATUS WITH REDUCED R. F. NOISE

BACKGROUND OF THE INVENTION

The present invention is directed to magnetic memory disk drive apparatus and more particularly to apparatus having a d.c. drive motor and means for eliminating R.F. noise generated by such motor.

Magnetic memory disks having recorded flux reversals and their associated pick-up heads are very sensitive to radio frequency noise generated by the drive apparatus. Such noise may simulate flux reversals and/or cause time shifts in the recorded flux reversals to produce erroneous data playback. One source of noise is the d.c. drive motor, however, even with an a.c. drive motor, noise may be produced by electrostatic charge on a driving belt.

In the prior art the drive shaft has been grounded by a slip ring and brushes. However, this grounding may not be continuous because of bouncing of the brushes or a degradation of the contact after use and/or inadequate maintenance. Since even error rates of one per hour of operation may not be tolerable, there is a need for disk drive apparatus which is substantially immune to R.F. error producing noise.

OBJECTS AND SUMMARY OF THE INVENTION

It is, therefore, a general object of this invention to provide an improved disk drive apparatus.

It is a more specific object of the invention to provide disk drive apparatus with reduced R.F. noise whereby errors due to such noise are substantially eliminated.

In accordance with the above objects there is provided an apparatus having sensing means for detecting changes in magnetic fields and also having relatively movable members capable of generating spurious changes in the magnetic fields. The apparatus comprises: noise control means for attenuating the spurious changes including shunt capacitive elements formed by adjacent faces of the relatively movable members whereby the spurious changes are attenuated.

BRIEF DESCRIPTION OF THE PREFERRED EMBODIMENT

Figure 1:
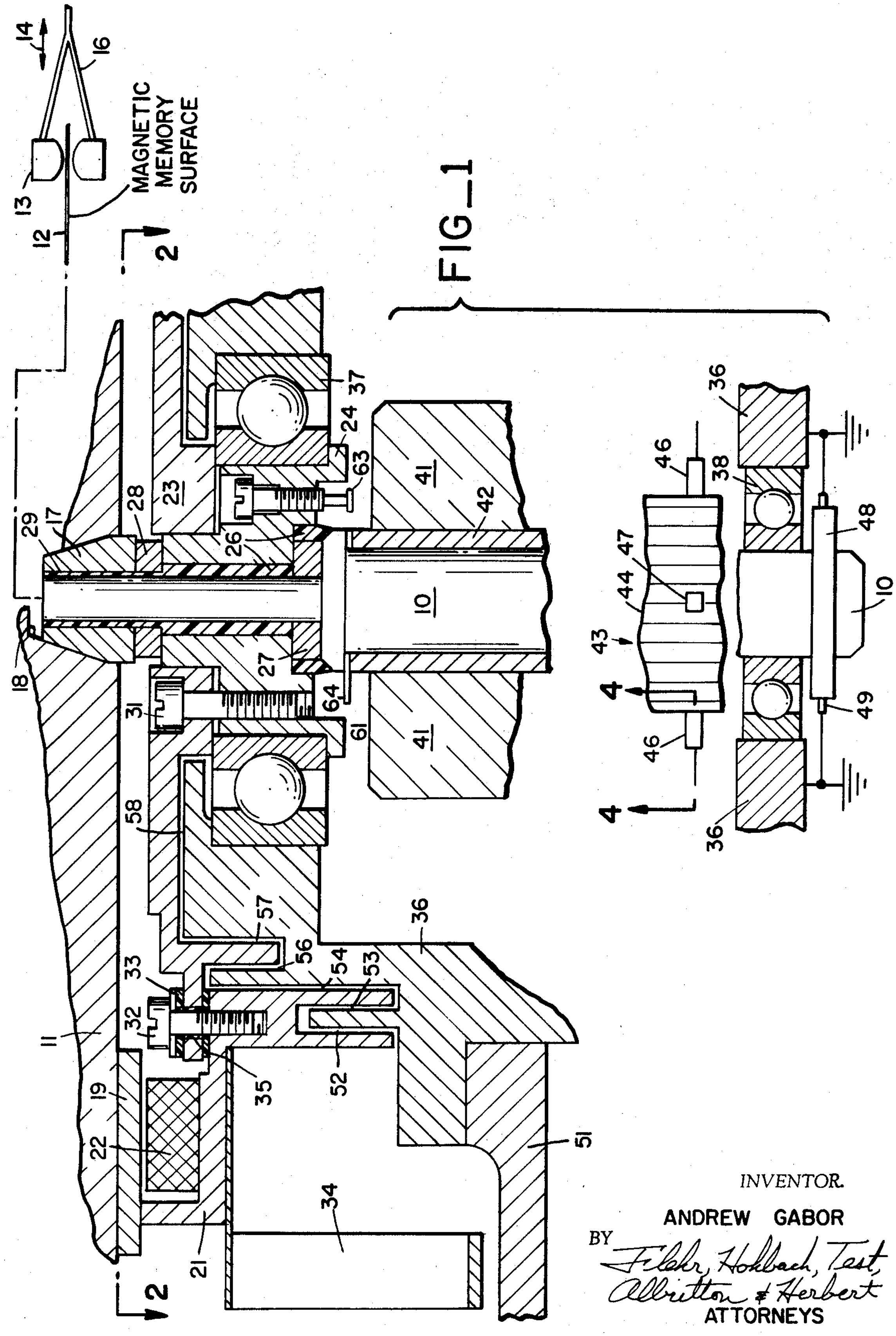
FIG. 1 is a cross-sectional view of a disk drive apparatus embodying the present invention.

Fig. 1 illustrates a steel shaft 10 which drives an annular aluminum platter or disk illustrated at 12 which has a magnetic memory surface. Disk 12 is contained in a disk memory cartridge such as the IBM 2315. This cartridge includes a driving plate 11 which is actually coupled to shaft 10. As is well known in the art, information is stored in the magnetic memory surface by aligning localized magnetic fields and these alignments produce flux reversals which are picked up by the head pair 13. Heads 13 are moved in the direction shown by arrow 14 by a system of arms 16. The construction of such a cartridge containing a magnetic memory disk and their associated playback-record heads is well known in the art.

The cartridge with its driving plate 11 is removable from the drive shaft 10 and when placed on the shaft is centered by means of a steel cone 17 which mates with a similarly shaped recess 18 in plate 11. Plate 11 also includes an annular steel ring 19 which serves as a drive hub.

Means for coupling shaft 10 to the plate 11 and its associated disk 12 includes an annular steel drive plate 21 on which is mounted an annularly shaped magnet 22, a steel drive plate hub 23 and a steel shaft hub 24. Magnet 22 attracts cartridge drive hub 19 into solid engagement with the upturned rim of drive plate 21.

Shaft hub 24 is directly mounted on shaft 10 by an electrical insulating collar which includes an epoxy adhesive 26 and alumina ceramic spacers 27 and 28. Epoxy adhesive 26 also extends to the tip of the shaft at 29 to electrically insulate cone 17 from shaft 10. Epoxy adhesive material and alumina ceramic are both well known for their good electrical insulation quality.

Figure 2:
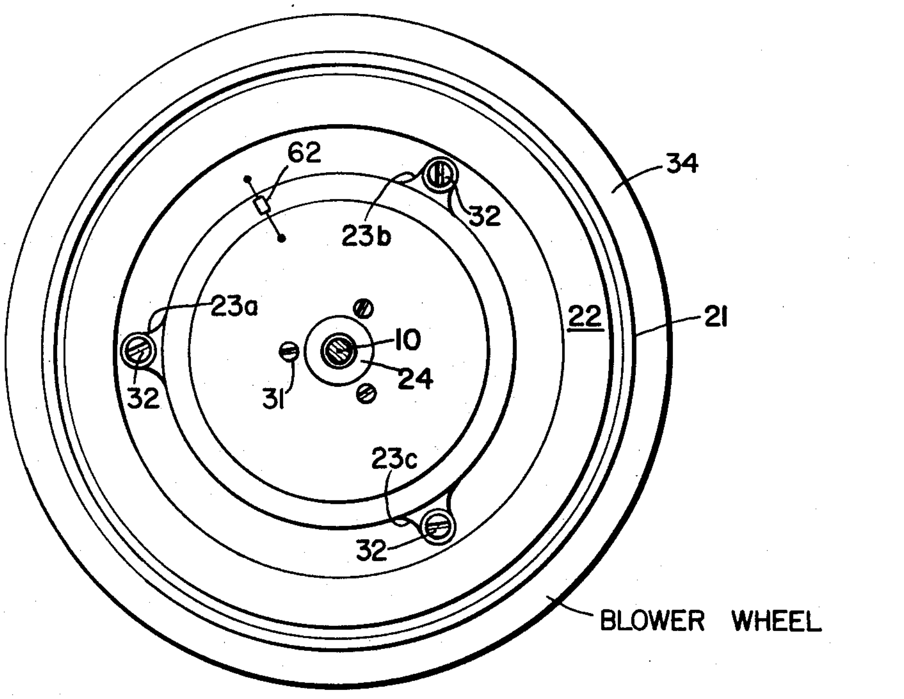
FIG. 2 is a cross-sectional view taken substantially along the line 2—2 of FIG. 1.

Drive plate hub 23 is affixed to shaft hub 24 by machine screws 31 and similarly plate hub 23 is affixed to plate 21 by machine screws 32. However, as best illustrated in FIG. 2 the latter coupling occurs only at three extensions 23*a*, *b* and *c* of drive plate hub 23. Moreover, epoxy glass insulating washers 33 along with nylon insulating sleeves 35 provide electrical insulation between drive plate hub 23 and the drive plate 21.

Drive plate 21 also carries a blower wheel 34 which provides for air circulation through the cartridge itself.

Shaft 10 is mounted for rotation in an aluminum alloy housing 36 by upper bearings 37 which are coupled to shaft hub 24 and lower bearings 38 which are coupled to shaft 10 and the housing directly. Housing 36 is grounded and provides an enclosure for a d.c. drive motor for shaft 10. The motor is of standard design and is only partially illustrated. It includes a rotor which has a motor winding 41 mounted on a motor hub 42 which is affixed to shaft 10. A commutator 43 includes individual copper bars 44 and two pairs of brushes 46 and 47 (only one brush of pair 47 is shown). The power brushes are appropriately spring biased and coupled to a d.c. power source in a manner well known in the art. The end of shaft 10 is also grounded to housing 36 through a slip ring 48 with brushes 49. The entire housing 36 is supported by a base plate casting 51 which is the main support for the overall disk drive apparatus.

In order to provide an effective shunt capacitance from both drive plate 21 and drive plate 23 to ground or housing 36, interleaving of the surfaces of the plates is provided with surfaces of housing 36. Specifically, drive plate 21 includes three pairs of parallel adjacent surfaces 52, 53 and 54 and drive plate hub 23 includes two pairs of parallel adjacent surfaces 56 and 57. In the present embodiment these are all vertical surfaces. In addition, a substantial capacitive effect is provided by the horizontal adjacent surfaces 58 between the drive plate hub 23 and housing 36. These two respective capacitances are shown in an equivalent circuit in FIG. 3 as capacitor 52, 53 and 54 and as capacitor 56, 57 and 58. Each provides a capacitance of substantially 400 picofarads.

Other capacitors provided by the foregoing structure are high impedance series capacitors of substantially 40 picofarads which occur between hub 24 and shaft 10 designated capacitor 10, 24 and a second high impedance series capacitance which is formed by the insulating washer 33 and insulating sleeve 35 between drive plate hub 23 and drive plate 21 designated capacitor 21, 23. Across both of these series capacitors, 10, 24 and 21, 23 are one megohm resistors 61 and 62 respectively which form a leakage path for electrostatic charge which may accumulate on the surface of disk 12.

The actual physical location of resistor 62 is illustrated in FIG. 2. Resistor 61, as indicated in FIG. 1, may be connected between a terminal 63 screwed into shaft hub 24 and a terminal 64 on motor hub 42.

Figure 3:
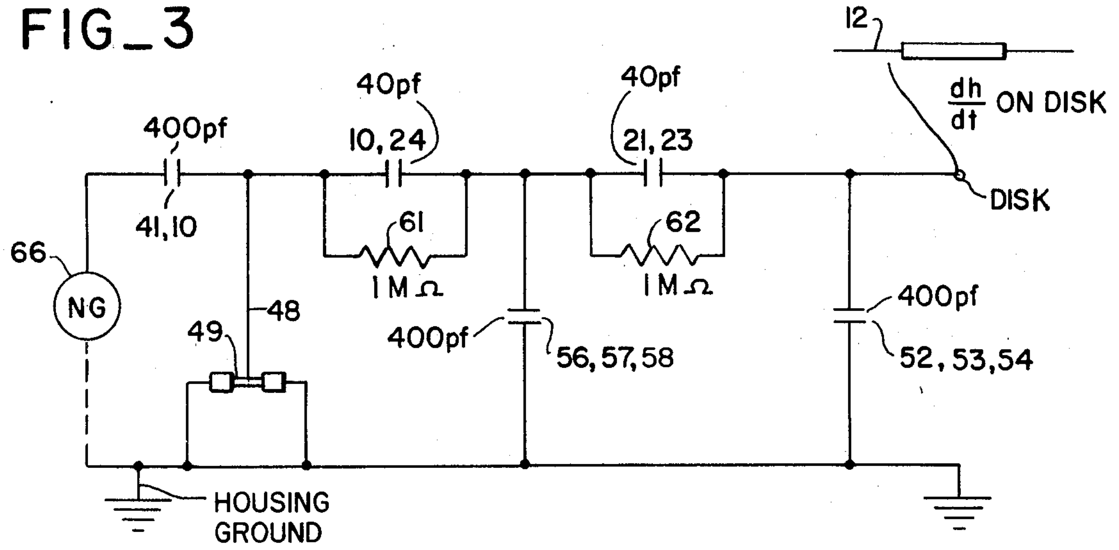
FIG. 3 is an equivalent circuit of FIG. 1.

The equivalent circuit of FIG. 3 illustrates how with the apparatus of the present invention the radio frequency noise generated by the commutating action of the d.c. motor is effectively attenuated to prevent such noise from reaching magnetic memory disk 12. Initially, such noise is present in the motor winding 41 and is indicated as a noise generator 66. Such noise consists of electrical energy which may be propogated both conductively through shaft 10 to magnetic disk 12 as is illustrated in FIG. 3 by that circuit and by electromagnetic radiation through the upper bearing 37 to disk 12.

The latter electromagnetic propogated energy is attenuated by the labyrinth construction provided by the above-mentioned interleaved parallel surfaces. These form in effect a waveguide which has a cutoff frequency below all substantial microwave noise signals generated by the d.c. motor which would tend to interfere with record-playback head 13 of the memory disk. In the preferred embodiment such cutoff frequency is substantially lower than the high frequency component of a recorded signal.

From an electrical conductive standpoint and referring to FIG. 3, noise generator 66 is in effect coupled to shaft 10 by the effective capacitance between winding 41 and shaft 10 designated 41, 10. This is of the order of 400 picofarads. In order to shunt some of this noise the slip ring 48 along with brushes 49 is provided as indicated which extend to the housing ground. However, the problem of intermittent disconnection of the coupling makes it impractical to rely upon completely. In addition, it is also apparent that the bearings 37, 38 do not offer sufficient grounding capability since the lubricating film acts as an insulating layer.

From examination of FIG. 3 it is apparent that the two shunt capacitors of relatively high value with respect to the noise frequencies generated tend to attenuate the generated noise at noise generator 66 by shunting this noise to ground. The two series capacitors having a relatively low value in the 40 picofarad range tend to also attenuate such noise. Spurious electrostatic noise signals occur on disk 12 due to the generated noise. Such electrostatic field produces attendant spurious flux reversals, designated *dH/dt*, and/or timing shifts in the recorded flux reversals. The foregoing are so severely attenuated that substantially all errors due to this noise are eliminated. Thus, the pickup heads of the disk drive are not influenced by the d.c. motor produced noise. The one megohm resistors 61, 62, however, provide a high impedance conductive path from the disk to ground through the slip ring 48 and brushes 49 to drain off any electrostatic charge which otherwise might accumulate on memory disk 12.

Since as discussed above the commutating action of the d.c. motor is an inherent noise generator the magnitude of noise generated can also be reduced in accordance with the invention by improvement of the commutating action. This in part is achieved by providing a redundant brush pair 47 to thus improve the commutating action because of better electrical contact and better switching. In addition, electrical contact between the brushes and the bars 44 themselves are enhanced by plating the copper bars with chromium. This is done by first grinding the bars 44 to assure their circularity, thereafter plating with chromium material and again grinding the chromium material to assure perfect circularity. This is also believed to affect the chemical property of the plated surface to provide more reliable electrical contact with the brushes.

Figure 4:
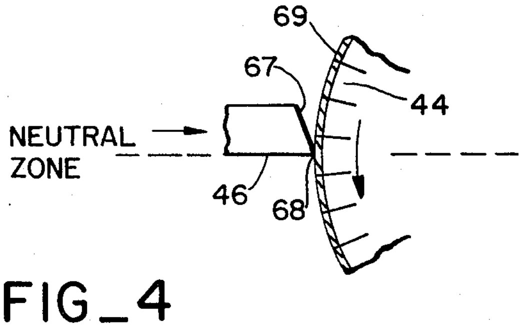
FIG. 4 is a cross-sectional view taken along the line 4—4 of FIG. 1.

With respect to the brushes 46 and 47, in accordance with the invention better electrical contact is achieved by shaping the faces 67 of the brushes so that substantially only the trailing edge 68 is in contact with the bars 44. Moreover, this contact point 68 is located at the neutral zone of commutation, whereas, the normal location for a brush of a d.c. motor would have the center line of the brush itself in this neutral zone. The shaping of the head of the brush in conjunction with the plating of the commutator bars 44 as shown by the chromium layer 69 in FIG. 4 all combine to reduce the amplitude of noise produced by the d.c. motor.

Thus, the present invention has provided improved magnetic memory disk drive apparatus with reduced radio frequency noise. The present invention is also useful in applications other than disk memories; specifically, any system which has a relatively movable means capable of generating noise where the system includes a detecting device responsive to magnetic fields. One example is a rotating antenna system.

I claim:

1. Magnetic memory disk drive apparatus comprising: housing means composed of an electrically conductive material; a shaft mounted for rotation in said housing; a d.c. motor having its rotor and a commutator mounted on said shaft said commutation of said motor producing undesirable radio frequency noise; means for coupling said shaft to a magnetic memory disk said means including electrically conductive planar surface means mounted for rotation with said shaft and having surfaces interleaved with surfaces of said housing means to form a capacitor, whereby radio frequency noise generated by said d.c. motor is shunted to said housing by said capacitor said coupling also including an electrical insulating collar on said shaft on which the remainder of said coupling means is mounted said collar providing an effective high impedance series capacitor between said motor and disk with reference to said radio frequency noise.

2. Apparatus as in claim 1 where said shaft includes a slip ring and brushes coupling said ring to said housing to thereby ground said shaft.

3. Apparatus as in claim 1 where said rotor of said d.c. motor includes a commutator having a plurality of bars and brushes for contacting said bars.

4. Apparatus as in claim 3 where said bars are plated said bars being ground before and after plating.

5. Apparatus as in claim 4 where said plating is chromium.

6. Apparatus as in claim 3 where said brushes have shaped faces to provide substantial contact with said bars only at the trailing edge of a brush.

7. Apparatus as in claim 6 where said trailing edges are positioned at the neutral zones of said commutator.

8. Apparatus as in claim 3 where the number of brushes provided is double the number required for operation of said d.c. motor.

9. Apparatus as in claim 1 together with a high impedance resistor shunting said insulating collar and coupled between said shaft and coupling means for providing a leakage path for electrostatic charge on said disk.

10. Apparatus as in claim 1 where said means for coupling said shaft to said disk includes annular drive plate means coupled to said disk, and drive plate hub means coupled to said shaft and means for coupling said drive plate means to said drive plate hub means.

11. Apparatus as in claim 10 where said means for coupling said drive plate means to said drive plate hub means includes means for electrically insulating said drive plate means from said hub means such insulation providing an effective high impedance series capacitor between said motor and disk with reference to said radio frequency noise.

12. Apparatus as in claim 10 where both said drive plate hub means and said drive plate means have surfaces interleaved with said housing means to provide paralleled shunt capacitors.

13. Apparatus as in claim 12 where said interleaving of said drive plate means includes at least three pairs of parallel adjacent surfaces.

14. Apparatus as in claim 13 where said interleaving of said drive plate hub means includes at least two pairs of parallel adjacent surfaces.

15. Apparatus as in claim 11 where said means for coupling said drive plate means to said drive plate hub means includes a high impedance resistor for providing a leakage path for electrostatic charge on said disk.

* * * * *